US010762928B1

(12) United States Patent
Camus et al.

(10) Patent No.: US 10,762,928 B1
(45) Date of Patent: Sep. 1, 2020

(54) COGNITIVE MEDIA PLAYBACK

(71) Applicant: International Business Machines Corporation, Armonk, NY (US)

(72) Inventors: Kelly Camus, Durham, NC (US); Dana L. Price, Surf City, NC (US); Heather Saunders, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/363,340

(22) Filed: Mar. 25, 2019

(51) Int. Cl.
| | |
|---|---|
| *G11B 27/36* | (2006.01) |
| *G11B 27/00* | (2006.01) |
| *H04N 21/442* | (2011.01) |
| *H04N 21/422* | (2011.01) |
| *H04N 21/472* | (2011.01) |
| *H04N 21/466* | (2011.01) |
| *H04N 21/45* | (2011.01) |

(52) U.S. Cl.
CPC .......... *G11B 27/007* (2013.01); *G11B 27/36* (2013.01); *H04N 21/42201* (2013.01); *H04N 21/44218* (2013.01); *H04N 21/4532* (2013.01); *H04N 21/4667* (2013.01); *H04N 21/47217* (2013.01)

(58) Field of Classification Search
CPC ........ G11B 27/036; G06T 17/20; G06T 19/20
See application file for complete search history.

(56) References Cited

U.S. PATENT DOCUMENTS

| | | |
|---|---|---|
| 9,094,539 B1 | 7/2015 | Noble |
| 9,335,819 B1 | 5/2016 | Jaeger et al. |
| 9,606,622 B1 | 3/2017 | Brothers et al. |
| 9,665,169 B1 * | 5/2017 | Dai .................. G06F 3/011 |
| 2012/0254909 A1 | 10/2012 | Serdiuk |
| 2013/0018284 A1 | 1/2013 | Kahn et al. |
| 2015/0212575 A1 | 7/2015 | Song et al. |
| 2015/0381923 A1 * | 12/2015 | Wickenkamp ......... G11B 27/36 386/344 |
| 2016/0089028 A1 | 3/2016 | Chatterjee et al. |
| 2017/0223413 A1 | 8/2017 | Kozloski et al. |
| 2017/0351812 A1 * | 12/2017 | Green ................ G16H 40/67 |

FOREIGN PATENT DOCUMENTS

| | | |
|---|---|---|
| CN | 105425962 A | 3/2016 |
| WO | 2018201325 A1 | 11/2018 |

OTHER PUBLICATIONS

"Music Off! I'm Sleeping—Apps on Google Play," https://play.google.com/store/apps/details?id=com.utopia.musicoff&hl=en, printed Feb. 6, 2019, 1 pg.

Mell et al., "The NIST Definition of Cloud Computing," Recommendations of the National Institute of Standards and Technology, U.S. Department of Commerce, Special Publication 800-145, Sep. 2011, 7 pgs.

\* cited by examiner

*Primary Examiner* — Eileen M Adams
(74) *Attorney, Agent, or Firm* — Peter K. Suchecki (57) ABSTRACT

Provided is a method, system, and computer program product for dynamically enhancing the media consumption experience of a user. A processor may output media content selected by a user on a media playback device. The processor may receive data indicating a sleep state of the user from a determination device. The processor may alter the output of the media content based, at least in part, on a type of the media content and the sleep state of the user.

18 Claims, 8 Drawing Sheets

| Type of Media Content | Output of Media Content (Asleep) | Perform Action (Awake) |
|---|---|---|
| Audiobook | Pause immediately, rewind 15 mins | Resume when initiated by user |
| Movie | Pause immediately, rewind 10 mins | Resume |
| Television (Comedy) | Pause immediately, rewind 15 mins | Resume |
| Television (News) | Pause immediately | None |
| White Noise | Continue playback, pause at deep sleep determination | Resume when at light sleep determination |
| Music | Continue playback, pause after 15 mins | Resume at beginning of track |
| Electronic Book (e-book) | Bookmark page, power off | Resume at bookmarked page |
| Video game | Pause immediately, notify other gamers user is asleep | Resume when initiated by user |

COGNITIVE MEDIA PLAYBACK

BACKGROUND

The present disclosure relates generally to the field of electronics, and more specifically, to cognitive media playback for dynamically enhancing the media consumption experience of a user.

Electronic devices, such as smartphones, are utilized by many users to consume various types of media content. In some instances, a user may consume media content prior to falling asleep. For example, a user may watch a movie, listen to a podcast or an audiobook on a mobile device while in bed. Some electronic devices may allow for the user to set a sleep timer that pauses the media content when a predetermined time expires.

SUMMARY

Embodiments of the present disclosure include a method, computer program product, and system for dynamically enhancing the media consumption experience of a user. A processor may output media content selected by a user on a media playback device. The processor may receive data indicating a sleep state of the user from a determination device. The processor may alter the output of the media content based, at least in part, on a type of the media content and the sleep state of the user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of electronics, and more particularly to cognitive media playback for dynamically enhancing the media consumption experience of a user. While the present disclosure is not necessarily limited to such applications, various aspects of the disclosure may be appreciated through a discussion of various examples using this context.

Electronic devices, such as smartphones, are utilized by many users to consume various types of media (e.g., audiobooks, electronic books, music, movies, games, etc.). In some instances, a user may consume media content prior to falling asleep. For example, a user may watch a movie or listen to an audiobook using an electronic device (e.g., smartphone, tablet, media player, smart tv, etc.) while in bed. If the user falls asleep, the media content may continue to play causing the user to miss portions of the content. Further, if the media content was streaming from a paid service, the user may have incurred data expenses for the missed content.

Some electronic devices may allow for the user to set a sleep timer that pauses the media content when the user has fallen asleep. For example, a user may set a manual sleep timer that automatically pauses the media content when a predetermined time limit expires. However, using a manual timer may lead to inadvertent pausing of the content prior to or after the user falls asleep. For example, a user may set a sleep timer for an audiobook to pause after 30 minutes, but the user may fall asleep after only 15 minutes. In this instance, the user must determine what portions of the audiobook were missed. Alternatively, the user may stay awake pass the set time of 30 minutes, such that the audiobook shuts off while the user is still listening. Pausing the audiobook while the user is currently listening may inconvenience the user and inhibit the user falling asleep when desired.

Embodiments of the present disclosure cognitively apply user preferences for altering media content playback based on the type of media content being consumed by the user. In an embodiment, a media playback device is linked to a biometric device (e.g., smartwatch, smart band, etc.) to determine a sleep state of a user. In embodiments, the sleep state may include various levels of consciousness ranging from awake to deep sleep (e.g., alert, light sleep, REM sleep, deep sleep, etc.). Depending on the determined sleep state and user preferences, the playback of media content may be altered.

For example, a user may prefer that movies immediately pause and rewind 10 minutes once the user falls asleep. The biometric device may send biometric data (e.g., low pulse rate, lack of movement of the user, etc.) indicating the user is asleep prompting the system to pause the movie and rewind 10 minutes based on user preferences. In this way, the user may resume the movie at a suitable playback position prior to when the user fell asleep without having to manually rewind the movie to the correct playback position. The system prevents the user from missing any relevant portions of the movie the user missed while sleeping.

In another embodiment, the system may analyze various sleeps states (e.g., light sleep, deep sleep, REM, etc.) of the user and perform actions based on the type of media content and the user preferences for each respective sleep state. For example, the system may determine that a user is listening to a white noise application to assist the user in falling asleep. The system may determine the user has fallen asleep via biometric data received from a linked biometric device. Once the user is determined to be in a deep sleep state based off of biometric data, the white noise application may be paused based on the user's preference for the respective type of media content. If biometric data indicates the user is moving from a deep sleep state into a light sleep state while the white noise application is paused, the system may resume playing the white noise application to aid the user in falling back into a deep sleep.

Embodiments of the present disclosure may utilize machine learning to dynamically learn preferences of a user based on historical preferences for altering media content in correlation with the user's sleep patterns. For example, the system may determine that after a user falls asleep listening to an audiobook, the user always rewinds the audiobook to a point that is an average of 15 minutes prior to sleep detection (e.g., determined by biometric data) when the user is awake. The system may apply this learned preference to other audiobooks, such that all audiobooks resume at 15 minutes prior to sleep detection of the user based on sleep state analysis and the behavioral patterns of the user. Once the user awakens, the audiobook may begin playing at the appropriate media playback position (e.g., 15 mins prior to sleep detection based on user preference) corresponding to where the system determined the user's sleep state has changed.

Embodiments of the present disclosure may apply default preferences based on the type of media content consumed. For example, entertainment content such as movies, television series, and/or audiobooks may include a default preference to cease playing immediately when the user is determined to be asleep. Stopping the content immediately prevents the user from missing relevant information regarding the content (e.g., important plots, scenes, etc.). Some types of content (e.g., movies, tv series, etc.) may be automatically rewound to a predetermined position (e.g., 15 mins prior to sleep detection), while other content may not be (e.g., news media content). In an embodiment, musical content may include a default setting to continue playback for a certain number of minutes past sleep detection or remain playing indefinitely. In some embodiments, the default setting may stop media playback during sleep detection and resume playback if the user is determined to be awake. In another embodiment, the system may shut down the device once the media content is paused, thereby reducing power usage of the device while the user is sleeping.

The aforementioned advantages are example advantages, and not all advantages are discussed. Furthermore, embodiments of the present disclosure can exist that contain all, some, or none of the aforementioned advantages while remaining within the spirit and scope of the present disclosure.

Figure 1:
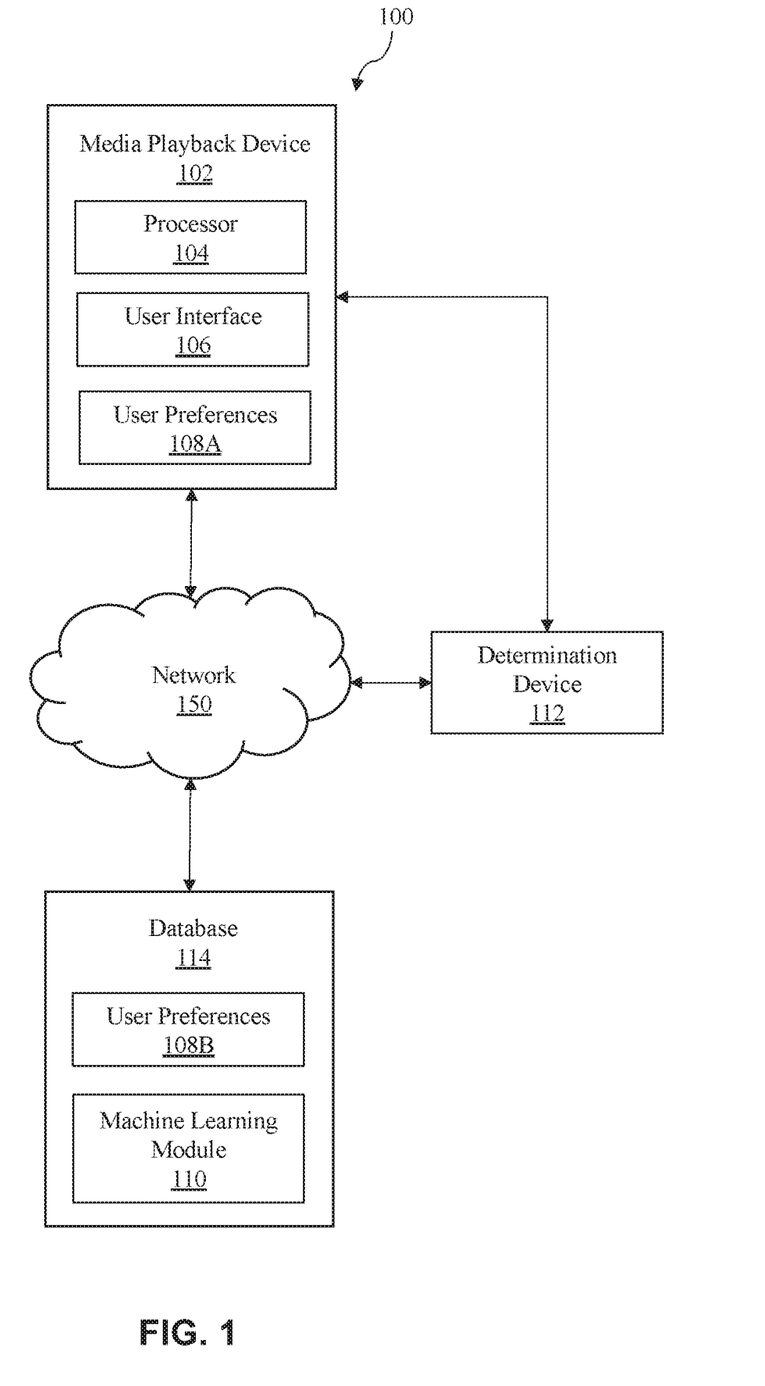
FIG. 1 illustrates a block diagram of a cognitive media playback system, in accordance with embodiments of the present disclosure.

With reference now to FIG. 1, shown is a block diagram of an exemplary cognitive media playback system 100, in accordance with embodiments of the present disclosure. In the illustrated embodiment, the cognitive media playback system 100 includes a media playback device 102, a determination device 112, and a database 114 that are communicatively coupled via a network 150. The network 150 may be any type of communication network, such as a wireless network or a cloud computing network.

Figure 8:
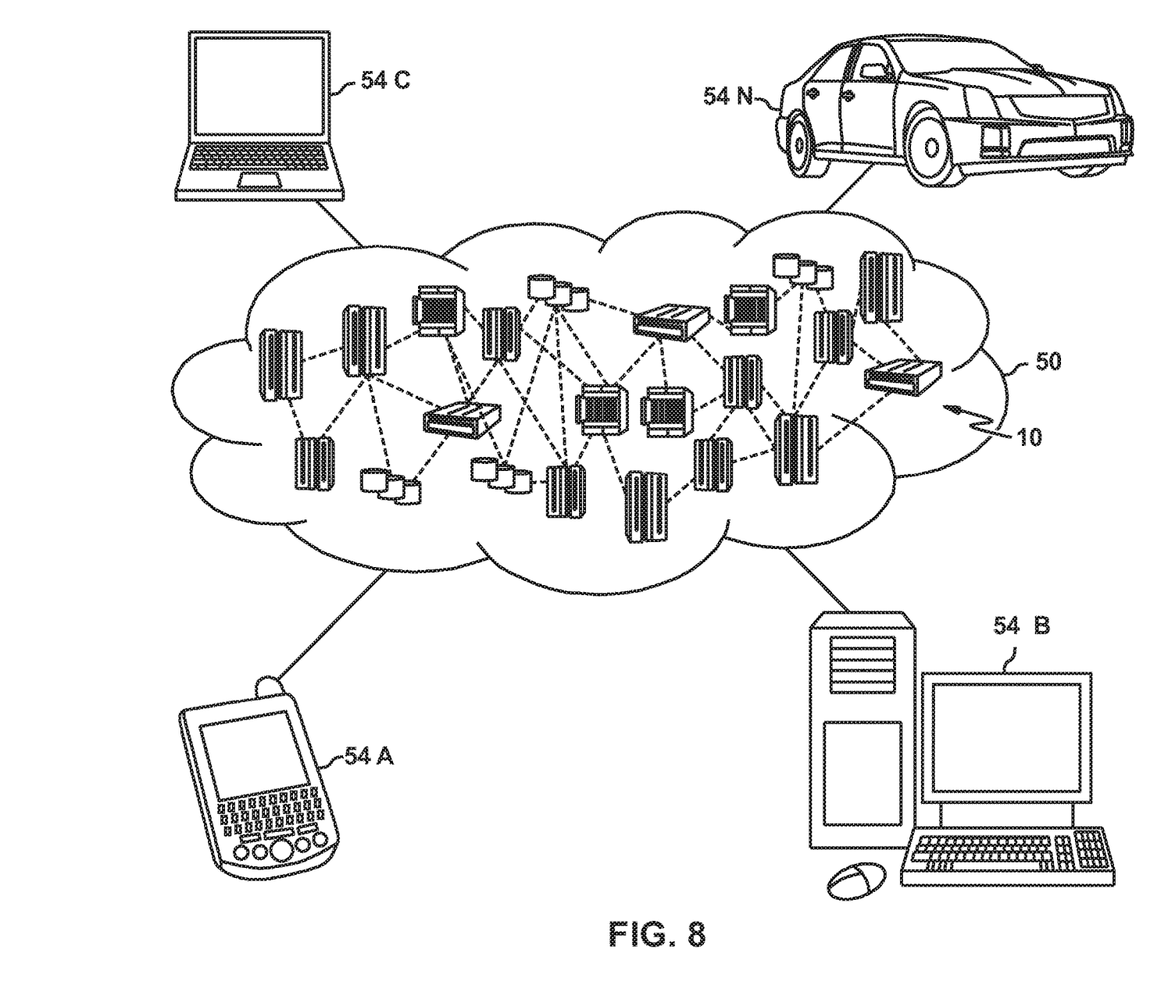
FIG. 8 depicts a cloud computing environment according to an embodiment of the present invention.
Figure 9:
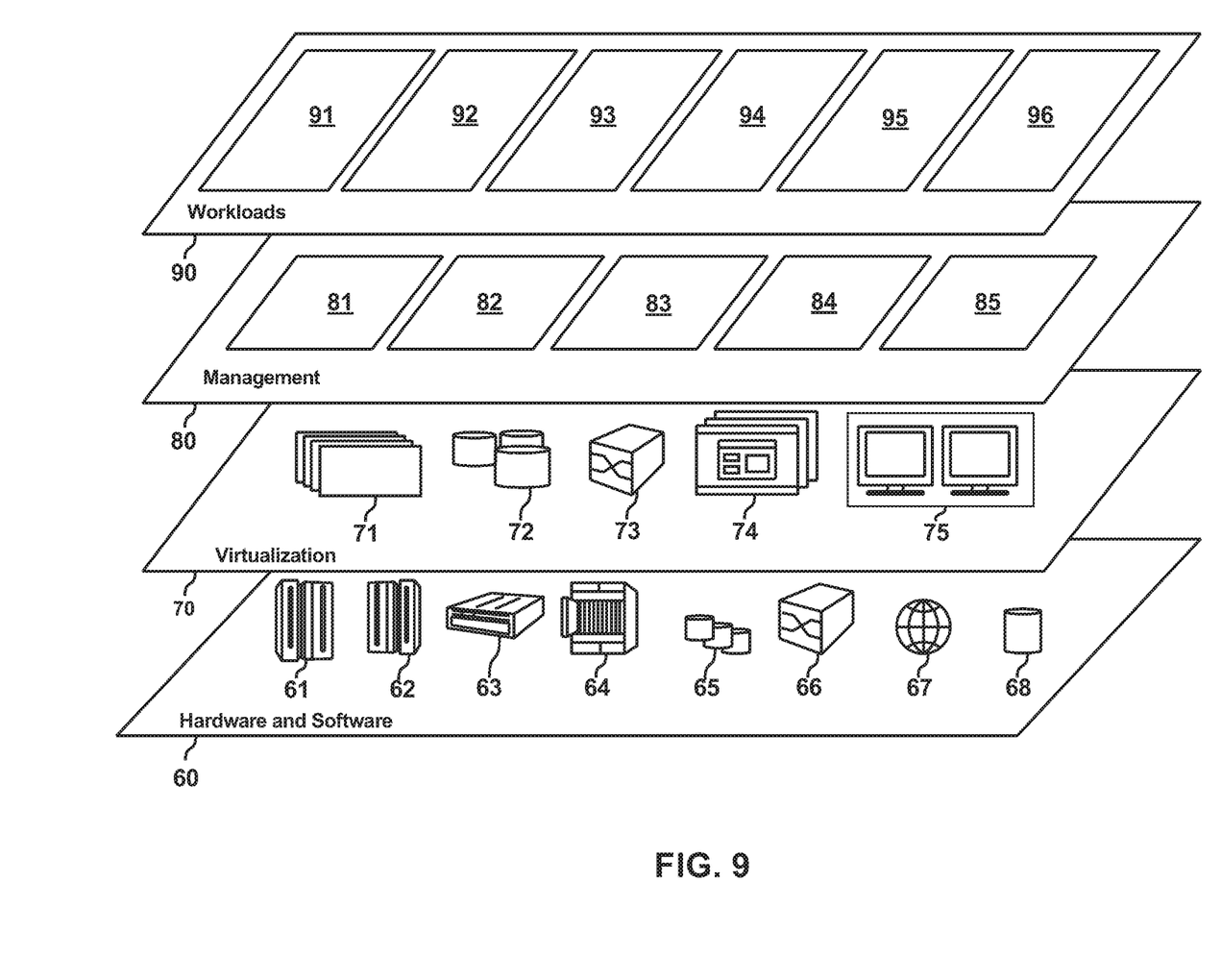
FIG. 9 depicts abstraction model layers according to an embodiment of the present invention.

The network 150 may be substantially similar to, or the same as, network 50 described in FIG. 8 and FIG. 9. In some embodiments, the network can be implemented using any number of any suitable communications media. For example, the network may be a wide area network (WAN), a local area network (LAN), a personal area network (PAN) used for exchanging data over short distances, an internet, or an intranet. In certain embodiments, the various systems may be local to each other, and communicate via any appropriate local communication medium. For example, the media playback device 102 may communicate with database 114 and/or determination device 112 using a WAN, one or more hardwire connections (e.g., an Ethernet cable) and/or wireless communication networks (e.g., wireless router, PAN). In some embodiments, the various systems may be communicatively coupled using a combination of one or more networks and/or one or more local connections. For example, the media playback device 102 may communicate with database 114 using a hardwired connection, while communication between the media playback device 102 and the determination device 112 may be through a wireless communication network (e.g., PAN).

Figure 7:
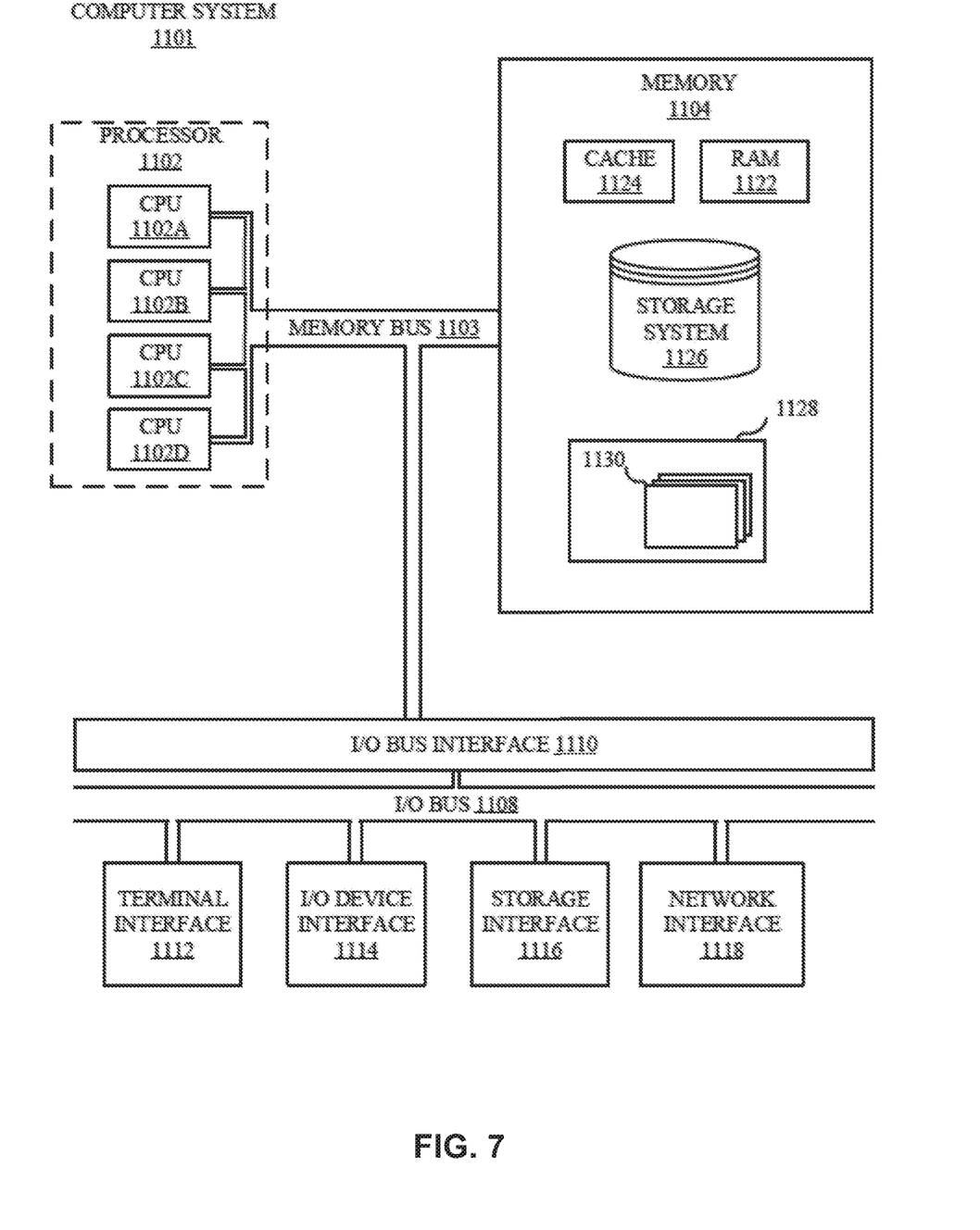
FIG. 7 illustrates a high-level block diagram of an example computer system that may be used in implementing one or more of the methods, tools, and modules, and any related functions, described herein, in accordance with embodiments of the present disclosure.

The media playback device 102 may be any type of computer system and may be substantially similar to computer system 1101 of FIG. 7. The media playback device 102 may be any type of device (e.g., smartphone, tablet, smart tv, computer, portable media player, and the like) configured to output media content. For example, the media playback device 102 may be a smart tv that can display video content (e.g., streaming media, tv shows, movies). In another example, the media playback device may be a smartphone that can output music, video, games, and/or audio files (e.g., streaming music, audiobooks, podcasts, white noise, etc.). The media playback device 102 is configured to receive data indicating a sleep state of a user from the determination device 112.

The determination device 112 may be any type of device configured to generate data that indicates the cognitive state of a user. For example, the determination device 112 may be a biometric device (e.g., smartwatch, smart band, etc.) that sends biometric data (e.g., pulse rate data, body motion data) to the media playback device 102 where the data indicates a sleep state of the user. For example, low pulse rate data (e.g., 55 beats/min) sent from a smartwatch to the media playback device 102 may indicate the user is asleep. The media playback device 102 may analyze the data from the determination device 112 and alter output of media content based on the determined sleep state of the user and on user preferences for the type of media content. The determination device 112 may be any type of computer system and may be substantially similar to computer system 1101 of FIG. 7. In an embodiment, the determination device may store preferences and issue commands to the media playback device.

In the illustrated embodiment, the media playback device 102 includes a processor 104, a user interface 106, and user preferences 108A. The user interface 106 allows a user to interact with the media playback device 102. For example, a user may manually adjust preferences 108A for the playback of musical content via the user interface 106. In an embodiment, the user preferences 108A may be default preferences set for the media playback device 102, manually selected preferences set by the user, or learned user preferences 108B received from database 114. In embodiments, user preferences 108B on database 114 may be accessed by other media playback devices via network 150.

In an embodiment, the media playback device 102 may send, receive, and/or store data at database 114. For example, user preferences 108A may be updated manually by the user. Once updated, these preference settings may be sent to the database 114 to update historical preference settings within user preferences 108B. The database 114 may be any type of computer system and may be substantially similar to computer system 1101 of FIG. 7. In some embodiments, database 114 may be a cloud database. Database 114 may store historical data regarding user preferences 108B, media content usage, and sleep state data. In some embodiments, the cognitive state determination device 112 may send, receive and/or store data at database 114.

In the illustrated embodiment, database 114 includes machine learning module 110. The machine learning module 110 may be any type of cognitive learning engine and/or learning module that includes various algorithms (e.g., supervised, unsupervised, semi-supervised, and/or reinforcement learning algorithms) for analyzing data generated by the cognitive media playback system 100 to dynamically set preferences for a user. For example, in an embodiment, the machine learning module 110 may include one or more artificial neural networks configured to learn from various inputs provided by the user (e.g., received from the media playback device 102). For example, the machine learning module 110 may analyze historical patterns of manually selected user preferences 108A from the media playback device 102 to cognitively determine how and when to alter media content.

In an embodiment, the machine learning module 110 may correlate sleep state data, length of playback time for specific types of media content, and historical user preferences to predict and/or automatically choose preference settings for the user. For example, a user may typically resume musical streaming content when they awake after sleeping. The system may update user preferences 108A and 108B to automatically resume musical content when the user awakes based on the modified user settings and biometric data. In an embodiment, as more data is learned by the system 100 (e.g., user selected preferences, changes to preference after user is awake, etc.) the weights of the neural network can be adjusted, automatically, by processor 104. Over time, the system 100 can become more accurate in determining when and how to alter the output of media content automatically without the input of the user. In other embodiments, the machine learning module may include alternative algorithms for analyzing data (e.g., fuzzy logic, etc.).

The above machine learning examples are only to be taken as example types of algorithms for determining learned preferences and are not meant to be limiting. Other processes and algorithms for determining learned preferences for media playback that are otherwise consistent with the embodiments of this disclosure are contemplated.

In an embodiment, the system may include multiple users each having a cognitive state determination device 112 (e.g., biometric device) that is coupled to the media playback device 102. For example, a group of users watching a movie on a smart tv may be analyzed via linked smart watches. If one or more users fall asleep watching the movie, the system may note the playback position of the movie based on the sleep state of each individual user. The system may correlate the preferences for each user and rewind the movie to a determined point based on sleep state thresholds. In this way, each user may resume watching the movie from a playback position based on their preferences.

It is noted that FIG. 1 is intended to depict the representative major components of cognitive media playback system 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with the system 100 may not be present, and the arrangement of components may vary.

For example, while FIG. 1 illustrates an example cognitive media playback system 100 having a single media playback device 102, one determination device 112 and one database 114, suitable network architectures for implementing embodiments of this disclosure may include any number of media playback devices, determination devices, and databases. The various models, modules, systems, and components illustrated in FIG. 1 may exist, if at all, across a plurality of media playback devices, cognitive state determination devices, and databases.

Figure 2:
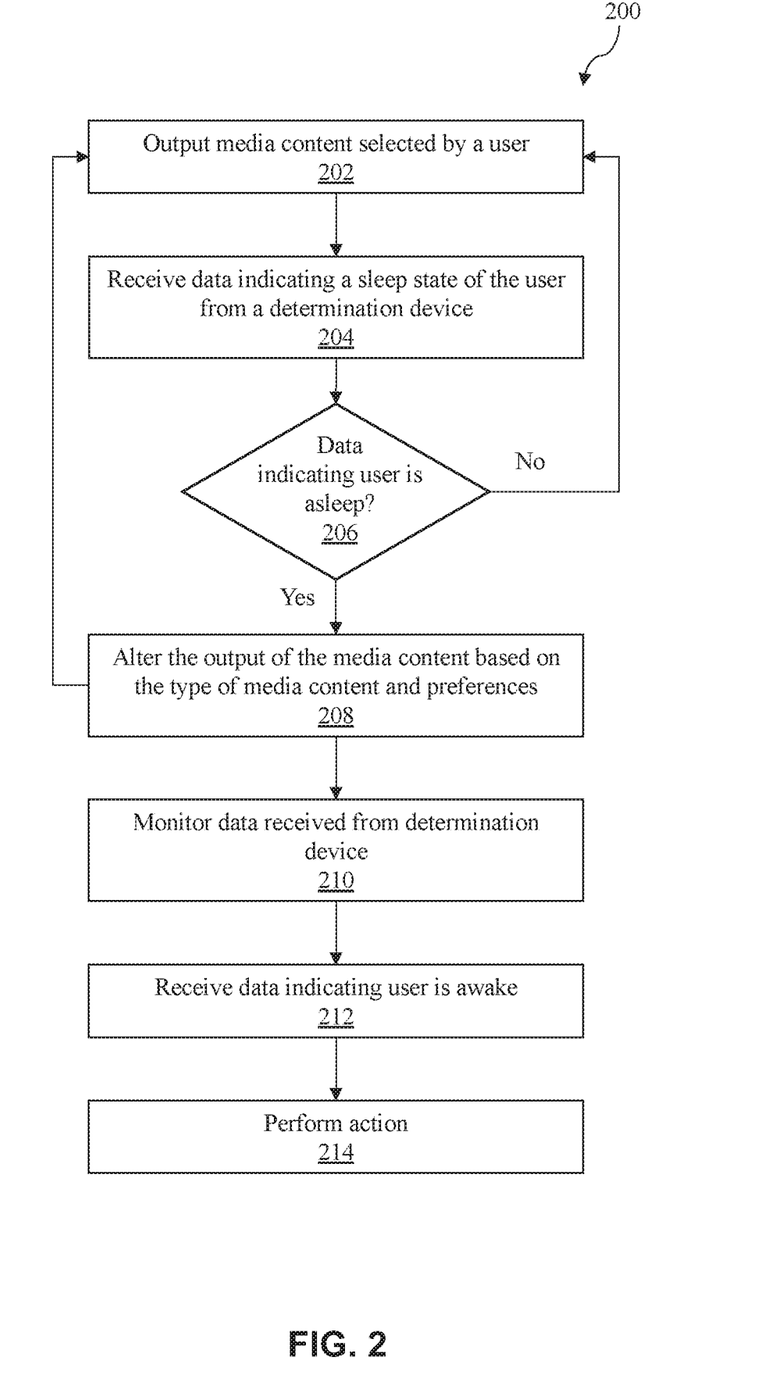
FIG. 2 illustrates a flow diagram of an example process for altering output of media content, in accordance with embodiments of the present disclosure.

Referring now to FIG. 2, shown is a flow diagram of an example process 200 for altering output of media content, in accordance with embodiments of the present disclosure. The process 200 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 200 is a computer-implemented process. The process 200 may be performed by processor 104 exemplified in FIG. 1.

The process 200 begins by the processor outputting media content selected by a user. This is illustrated at step 202. For example, a user may select to watch a movie on a smart phone by selecting the movie from a queue. Once selected, the device will output the selected media content to a display on the media playback device.

The process 200 continues by receiving data indicating a sleep state of the user from a determination device. This is illustrated at step 204. The determination device may be any type of device that generates data indicating the sleep state (e.g., awake, pre-sleep, asleep, deep sleep, light sleep, etc.) of the user. For example, the determination device may be a smart watch that monitors biometric data that correlates to a sleep state, such as heart rate and motion data of the user.

The process 200 continues by determining if the data received from the determination device indicates the user is asleep. This is illustrated at step 206. If the data indicates the user is still awake, "No" at step 206, the process 200 continues by maintaining the output of the media content as illustrated at step 202. For example, heart rate data may indicate a user is awake until the user's heart beat rate falls below a certain threshold (e.g., 60 beats/min). If the user is determined to be awake (e.g., 65 beat/min heart rate), the media content will continue to play.

If the data received indicates the user is asleep, "Yes" at step 206, the process 200 continues by altering the output of the media content based on the type of media content and preferences of the user. This is illustrated at step 208. The preferences may be default preferences that are assigned to the respective type of media content and/or manually selected preferences by the user. For example, a user may have set preferences to pause music when determined to be asleep, rewind the music to the beginning of the track, and resume the music when they awake. In an embodiment, the preferences may be determined by machine learning. A table of user preferences for altering media content is exemplified in FIG. 3.

Each specific type of media content will be altered according to user preferences. In one embodiment, the media content may be paused. For example, the user may decide that when watching a movie if the user is determined to be asleep, the movie will be paused immediately.

In another embodiment, the media content may be altered by continuing playback for a predetermined time. For example, a user may prefer to play music while trying to fall asleep. The user may adjust the preferences to keep the music playing for a length of time (e.g., 20 minutes) after the determination device indicates the user is asleep. In this way, the music plays for a limited time after the user has fallen asleep to aid the user in maintaining their sleep cycle. Once the predetermined time limit expires, the music will pause. In some embodiments the media playback device may shut down or go into a sleep mode.

In another embodiment, the media content may be paused and rewound for a predetermined number of minutes when the user has been determined to be asleep. For example, the user may prefer to pause a television series and rewind playback of the series to 15 minutes prior to falling asleep. In this way, the user does not miss any relevant information regarding the television series.

In another embodiment, the media content may be altered to play a second media content. For example, a user may fall asleep watching a movie, the movie may be immediately paused, and the media content may be switched to white noise audio to aid the user in staying asleep. If the system determines the user is awake, the white noise audio may be paused and the movie may resume.

In an embodiment, once the media content is altered according to the preferences for the user being asleep, the process 200 continues by monitoring data received from the determination device. This is illustrated at step 210. The processor will continue to monitor the biometric data received from the determination device to determine if the received data indicates the user is awake.

The process 200 continues by receiving data indicating the user is awake. This is illustrated at step 212. Once data is received indicating the user is awake, the process 200 continues by performing an action. This is illustrated at step 214. A list of actions that may be performed regarding the output of media content are exemplified in column 303 of FIG. 3. The performed action may alter the media content according to the user's preference. For example, when the system determines the user is awake, the system may actively resume music at the beginning of the track where it was determined the user initially fell asleep based on user preferences.

Figure 3:
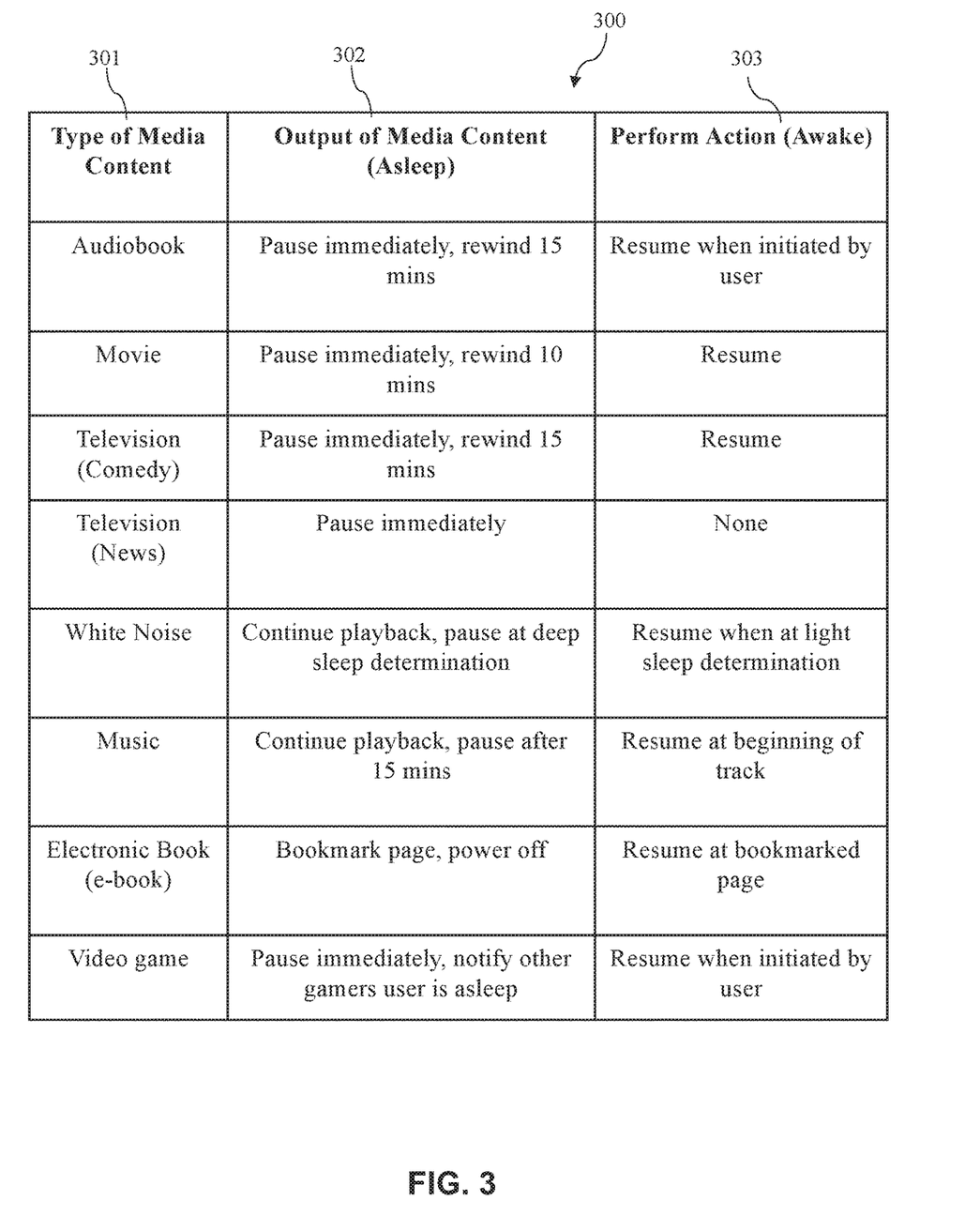
FIG. 3 illustrates a table of example user preferences for altering output of media content based on the type of media content, in accordance with embodiments of the present disclosure.

Referring now to FIG. 3, shown is a table 300 of example user preferences for altering output of media content based on type, in accordance with embodiments of the present disclosure. The table 300 exemplified in FIG. 3 is only used as an example and is not meant to be limiting. The first column 301 lists various types of media content that may be consumed by the user, such as an audiobook, movie, television show, white noise audio, music, e-book, and video game content. The second column 302 includes example user preferences for altering output of media content when the user is determined to be asleep. The third column 303 includes example user preferences for performing an action when the system determines the user is awake.

For example, the audiobook user preference is set to pause immediately and rewind 15 minutes when the user is asleep, while the perform action preference when the user is awake is set to resume when initiated by the user. In embodiments, the preferences may distinguish subsets of the type of media content. For example, a television show that is classified as "comedy" is set to pause immediately and rewind 15 minutes when the user is asleep, then resume when the user awakes. Alternatively, a television show that is classified as "news" is set to pause immediately when the user is asleep and remain off when the user awakes. In this way, media content that may be more important to the user (e.g., a funny comedy) may not be missed, while less important content may be ignored (e.g., nightly news, etc.). The preferences may be manually selected by the user, chosen as default preferences, or determined through machine learning.

Figure 4:
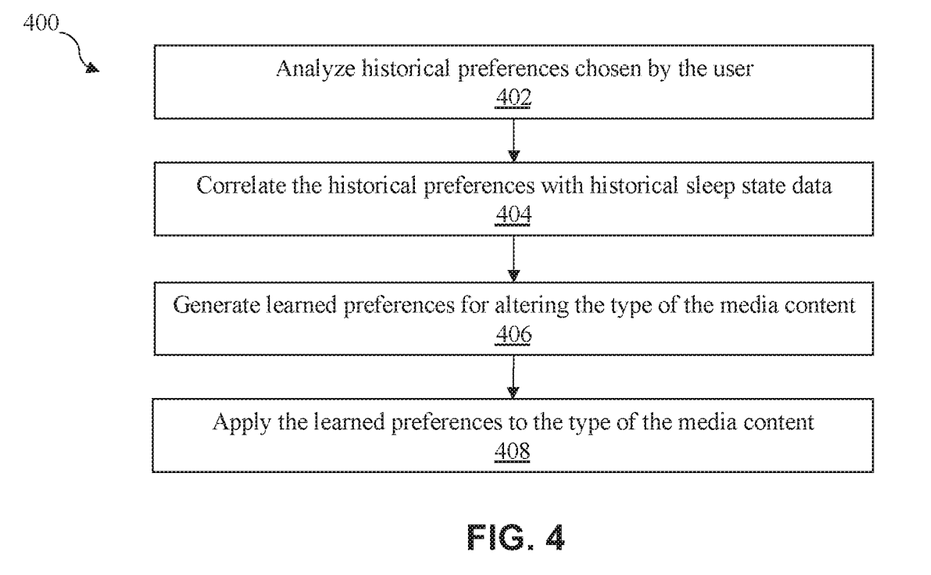
FIG. 4 illustrates a flow diagram of an example process for generating learned preferences for altering output of media content, in accordance with embodiments of the present disclosure.

Referring now to FIG. 4, shown is a flow diagram of an example process 400 for generating learned preferences for altering output of media content, in accordance with embodiments of the present disclosure. Process 400 may be in addition to or a subset of process 200. The process 400 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 400 is a computer-implemented process. The process 400 may be performed by processor 104 exemplified in FIG. 1.

Process 400 begins by analyzing historical preferences chosen by the user for altering the type of the media content. This is illustrated at step 402. The analyzing may be performed using machine learning module 110 exemplified in FIG. 1. The historical preferences may be stored at user preferences 108A located on the media playback device 102, user preferences 108B located on database 114, or in some embodiments, on the determination device 112.

The process 400 continues by correlating the historical preferences with historical sleep state data received from the determination device. This is illustrated at step 404. In embodiments, historical sleep state data (e.g., sleep patterns, sleep state thresholds, length of sleep for various sleeps states, biometric data, etc.) may be stored on the determination device, database, or the media playback device.

The process 400 continues by generating learned preferences for altering the type of the media content. This is illustrated at step 406. The machine learning module 110 may comprise various machine learning engines (artificial neural network, correlation engines, natural language processing engine, reinforcement feedback learning model, etc.) to analyze data generated from the historical preferences and sleep state data to dynamically set preferences for the user. For example, the machine learning module may determine that the user always rewinds an audiobook an average time of 15 minutes after falling asleep. The machine learning module may update the learned preferences based on the historical patterns of the user. In another embodiment, the machine learning module may include various thresholds to determine if user preferences should be updated. For example, to set a rewind preference the system may analyze the number of times the user has altered the rewind state and/or the percentage of time the user alters the rewind state. After a learned preference is determined, the system may confirm the potential change to existing preferences with the user.

Once the learned preferences are generated for altering the media content, the process 400 continues by applying the learned preferences to the type of the media content. This is illustrated at step 408. In embodiments, the learned preferences may be applied to all media playback devices operated by the user or only manually selected media devices determined by the user.

Figure 5:
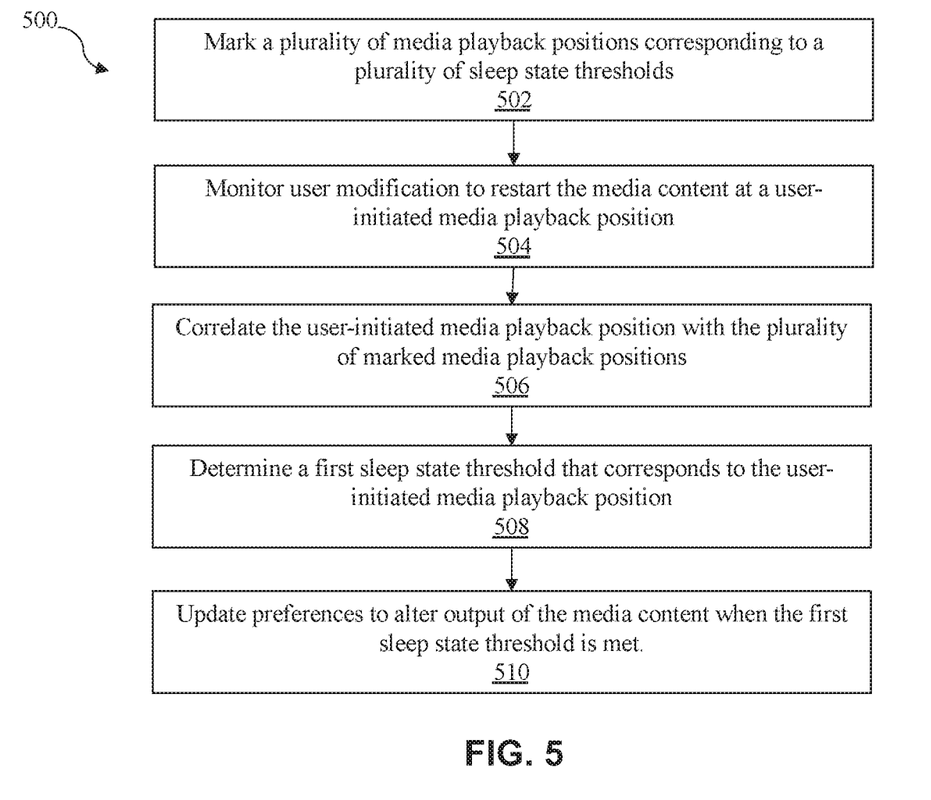
FIG. 5 illustrates a flow diagram of an example process for correlating a user-initiated media playback position of the media content with changes in user cognitive sleep level, in accordance with embodiments of the present disclosure.

Referring now to FIG. 5, shown is a flow diagram of an example process 500 for correlating a user-initiated media playback position of the media content with changes in user cognitive sleep level, in accordance with embodiments of the present disclosure. Process 500 may be in addition to or a subset of process 200. The process 500 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 500 is a computer-implemented process. The process 500 may be performed by processor 104 exemplified in FIG. 1.

The process 500 begins by marking a plurality of media playback positions corresponding to a plurality of sleep state thresholds while a user is consuming a type of media content. This is illustrated at step 502. Each of the plurality of media playback positions is marked when a respective sleep state threshold is met. For example, the playback position (e.g., marked playback position) of the media content may be at 1:00 when biometric data indicates the user's sleep state has changed from alert to quiet rest, 1:18 when biometric data indicates the user's sleep state has changed from quiet rest to pre-sleep, and 1:22 when biometric data indicates the user's sleep state has changed from pre-sleep to asleep. When moving to each sleep state, the system would mark the playback position at the respective sleep state. In this example, it is assumed that the user has fallen asleep at 1:22 while consuming the media content.

The process 500 continues by monitoring, in response to receiving data indicating the user is awake, user modification (e.g., a monitored user modification) to restart the media content at a user-initiated media playback position. This is illustrated at step 504. For example, when the user returns to active consumption of the media content, any manual changes to the rewind state of the media would be noted by the system. For example, if when the user awakes, the user rewinds the media content to 1:19, the system would mark the user-initiated playback position.

The process 500 continues by correlating the user-initiated media playback position with the plurality of marked media playback positions corresponding to respective sleep states. This is illustrated at step 506. The process 500 continues by determining, based off of the correlating, a first sleep state threshold that corresponds to the user-initiated media playback position. This is illustrated at step 508. For example, the system would note that the specific type of media content was rewound to a user-initiated playback position relative to a first sleep state. For example, the user-initiated playback position was at 1:19, which is 1 minute after the biometric data indicated the sleep state changed from quiet rest to pre-sleep (e.g., 1:18) and 3 minutes prior to when the user was determined to be asleep (e.g., 1:22).

The process 500 continues by updating settings to alter output of the media content when the first sleep state threshold is met. This is illustrated at step 510. Once the system analyzes the user's modification patterns against the marked sleep states, the system would use this information to pause the media content automatically when a respective sleep state threshold is met. For example, returning to the example above, the system would turn off the media playback device or the streaming of media content 1 minute after the user passes the pre-sleep level based on the correlation between the biometric data and the user modification. In another embodiment, the system may update preferences to rewind the specific media content to one minute past the determination of the user being in the pre-sleep state. In embodiments, various changes or additions made by the system to existing preferences may be based on different thresholds.

Figure 6:
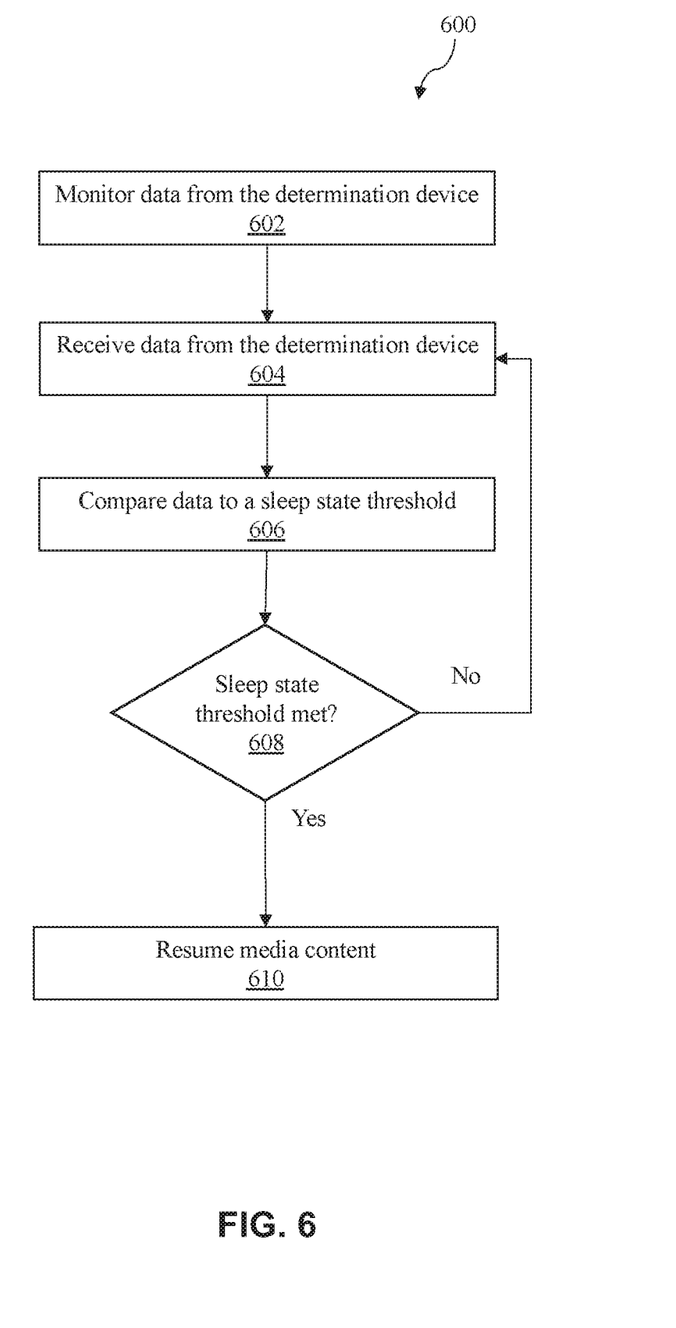
FIG. 6 illustrates a flow diagram of an example process for resuming media content when a sleep state threshold is met, in accordance with embodiments of the present disclosure.

Referring now to FIG. 6, shown is a flow diagram of an example process 600 for resuming media content when a sleep state threshold is met, in accordance with embodiments of the present disclosure. Process 600 may be in addition to or a subset of process 200. The process 600 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 600 is a computer-implemented process. The process 600 may be performed by processor 104 exemplified in FIG. 1.

The process 600 begins by monitoring data from the determination device. This is illustrated at step 602. It is assumed that the user has already been determined to be in a deep sleep state when process 600 begins. For example, the user may have fallen asleep listening to white noise media content. The user may set a preference to pause the white noise media content when the system determines the user is in a deep sleep state based on data received from the determination device. Once the deep sleep state is reached, the processor will continue to monitor the data received from the determination device.

The process 600 continues by receiving data from the determination device. This is illustrated at step 604. The data may indicate the user is moving from one sleep state to another (e.g., deep sleep to light sleep). The process 600 continues by comparing the received data to a sleep state data threshold. This is illustrated at step 606. In an embodiment, the sleep state data threshold may be a light sleep data threshold. The light sleep data threshold may include an upper and lower range that indicates when the user is in a light sleep (e.g., when the user's heart rate data falls within 55-60 beats/min). The thresholds may be adjusted based upon each user and/or machine learning.

If the data does not meet the sleep state data threshold, "No" at step 608, then the process 600 will continue to monitor the data received from the determination device. For example, the data may indicate the user is still in a deep sleep (e.g., 54 beats/min).

If the data meets the sleep state threshold, "Yes" at step 608, then the process 600 continues by resuming playback of the media content in response to the data meeting the data threshold. This is illustrated at step 610. For example, white noise media content may have been initially paused when the user fell into a deep sleep state. Once the system determined the user is moving into a light sleep state, the white noise media content is resumed. Resuming the white noise assists the user in staying within the sleep cycle instead of waking up. Based on user preferences for white noise audio, the system may pause the white noise media content when biometric data indicates the user is back in a deep sleep state. Embodiments for pausing media content when the user is asleep are further detailed in FIG. 2 and FIG. 3.

Referring now to FIG. 7, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface unit 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 200, 400, 500, and 600).

System memory 1104 may include computer system readable media in the form of volatile memory, such as random-access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 1104 can include flash memory, e.g., a flash memory stick drive or a flash drive. Memory devices can be connected to memory bus 1103 by one or more data media interfaces. The memory 1104 may include at least one program product having a set (e.g., at least one) of program modules that are configured to carry out the functions of various embodiments.

Although the memory bus 1103 is shown in FIG. 7 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interface units 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 1101. In some embodiments, however, individual components may have greater or lesser complexity than as represented in FIG. 7, components other than or in addition to those shown in FIG. 7 may be present, and the number, type, and configuration of such components may vary.

One or more programs/utilities 1128, each having at least one set of program modules 1130 may be stored in memory 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer-readable storage medium (or media)

having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A method comprising:
outputting, by a processor, media content, wherein the media content is selected by a user;
receiving, by the processor, first data indicating a sleep state of the user from a determination device associated with the user;

17 altering, by the processor, the output of the media content based, at least in part, on a type of the media content and the sleep state of the user;

monitoring, by the processor, data received from the determination device;

receiving, by the processor, second data indicating the user is awake; and performing, by the processor and in response to receiving the second data indicating that the user is awake, an autonomous action regarding playback of the media content, wherein the autonomous action includes automatically resuming the media content.

2. The method of claim 1, wherein altering the output of the media content is selected from the group consisting of:

pausing, by the processor and in response to receiving the first data indicating the user is asleep, the media content immediately;

continuing, by the processor and in response to receiving the first data indicating the user is asleep, playback of the media content for a first predetermined number of minutes, wherein once the first predetermined number of minutes expire playback of the media content stops; and rewinding, by the processor and in response to receiving the first data indicating the user is asleep, the media content for a second predetermined number of minutes.

3. The method of claim 1, wherein the autonomous action is to automatically resume the media content at a marked playback position.

4. The method of claim 1, wherein altering the output of the media content comprises:

continuing, by the processor and in response to receiving the first data indicating the user is asleep, output of the media content for a predetermined number of minutes, wherein once the predetermined number of minutes expire output of the media content stops;

receiving, by the processor, third data from the determination device;

comparing, by the processor, the third data to a sleep state data threshold, wherein meeting the sleep state data threshold indicates the user is in a light sleep state; and resuming, by the processor, playback of the media content in response to the third data meeting the sleep state data threshold.

5. The method of claim 1, further comprising:

retrieving, by the processor, user preferences for the outputting the type of the media content, wherein altering output of the media content is further based on the user preferences.

6. The method of claim 1, further comprising:

monitoring, by the processor and in response to receiving the second data indicating the user is awake, user modification to the output of the media content; and updating, by the processor, settings to alter output of the media content based on the monitored user modification.

7. The method of claim 1, further comprising:

analyzing, by the processor and utilizing machine learning, historical preferences chosen by the user for altering the type of the media content;

correlating, by the processor and utilizing machine learning, the historical preferences with historical sleep state data received from the determination device;

generating, by the processor in response to the analyzing, learned preferences for altering the type of the media content; and

18 applying, by the processor, the learned preferences to the type of the media content.

8. The method of claim 1, wherein the determination device is biometric device configured to transmit biometric data.

9. The method of claim 8, wherein the biometric data is heart rate data.

10. The method of claim 8, wherein the biometric device is a smart band.

11. The method of claim 1, further comprising:

marking, by the processor, a plurality of media playback positions corresponding to a plurality of sleep state thresholds, such that each media playback position is marked when a respective sleep state threshold is met;

monitoring, by the processor and in response to receiving the second data indicating the user is awake, user modification to restart the media content at a user-initiated media playback position;

correlating, by the processor, the user-initiated media playback position with the plurality of marked media playback positions;

determining, by the processor and based off of the correlating, a first sleep state threshold that corresponds to the user-initiated media playback position; and updating, by the processor, settings to alter output of the media content when the first sleep state threshold is met.

12. The method of claim 1, wherein the type of the media content includes at least one of:

an audiobook;
a movie;
a television show;
white noise audio;
music;
an electronic book; or
a video game.

13. The method of claim 1, wherein altering the output of the media content comprises changing, by the processor and in response to receiving the first data indicating the user is asleep, a first media content to second media content.

14. The method of claim 13, wherein the autonomous action comprises:

pausing, by the processor and in response to receiving the second data indicating the user is awake, the second media content; and resuming, by the processor, the first media content.

15. A cognitive media playback system comprising:

a media playback device communicatively coupled to a determination device associated with a user, wherein the media playback device includes:

a processor, wherein the processor is configured to perform a method, the method comprising:

outputting media content, wherein the media content is selected by the user;

receiving first data indicating a sleep state of the user from the determination device; and altering the output of the media content based, at least in part, on a type of the media content and the sleep state of the user;

monitoring, by the processor, data received from the determination device;

receiving, by the processor, second data indicating the user is awake; and performing, by the processor and in response receiving the second data indicating the user is awake, an autonomous action regarding playback of the media content, wherein the autonomous action includes automatically resuming the media content.

16. The cognitive media playback system of claim 15, wherein altering the output of the media content is selected from the group consisting of:
   pausing, in response to receiving the first data indicating the user is asleep, the media content immediately;
   continuing, in response to receiving the first data indicating the user is asleep, playback of the media content for a first predetermined number of minutes, wherein once the first predetermined number of minutes expire playback of the media content stops; and
   rewinding, in response to receiving the first data indicating the user is asleep, the media content for a second predetermined number of minutes.

17. A computer program product comprising a computer-readable storage medium having program instructions embodied therewith, wherein the computer-readable storage medium is not a transitory signal per se, the program instructions executable by a processor to cause the processor to perform a method comprising:
   outputting media content, wherein the media content is selected by a user;
   receiving first data indicating a sleep state of the user from a determination device associated with the user; and
   altering the output of the media content based, at least in part, on a type of the media content and the sleep state of the user;
   monitoring, by the processor, data received from the determination device;
   receiving, by the processor, second data indicating the user is awake; and
   performing, by the processor and in response receiving the second data, an autonomous action regarding playback of the media content, wherein the autonomous action includes automatically resuming the media content.

18. The computer program product of claim 17, wherein altering the output of the media content is selected from the group consisting of:
   pausing, in response to receiving the first data indicating the user is asleep, the media content immediately;
   continuing, in response to receiving the first data indicating the user is asleep, playback of the media content for a first predetermined number of minutes, wherein once the first predetermined number of minutes expire playback of the media content stops; and
   rewinding, in response to receiving the first data indicating the user is asleep, the media content for a second predetermined number of minutes.

\* \* \* \* \*